United States Patent [19]

Mincuzzi

[11] 4,172,310
[45] Oct. 30, 1979

[54] IMPROVEMENT IN ASSEMBLING A CENTRIFUGAL PUMP

[75] Inventor: Antonio Mincuzzi, Milan, Italy

[73] Assignee: Societe Internationale de Mecanique Industrielle S.A., Luxembourg

[21] Appl. No.: 868,993

[22] Filed: Jan. 12, 1978

Related U.S. Application Data

[62] Division of Ser. No. 722,644, Sep. 13, 1976, abandoned.

[30] Foreign Application Priority Data

Sep. 18, 1975 [FR] France .............................. 75 28614

[51] Int. Cl.² ...................... B23P 15/00; F01D 11/00
[52] U.S. Cl. ................................. 29/156.4 R; 29/464; 29/270; 29/271; 415/170 A
[58] Field of Search ............... 29/156.4 R, 156.8 CF, 29/464, 468, 270, 271, 281.1; 415/170 R, 170 A, 172 R, 173 R, 173 A, 219 C, 110–112

[56] References Cited

U.S. PATENT DOCUMENTS

| | | | |
|---|---|---|---|
| 1,814,704 | 7/1931 | Joyce | 415/170 A |
| 2,922,374 | 1/1960 | Perish | 415/172 R |
| 3,123,902 | 3/1964 | Isenbarger | 29/271 |
| 3,409,970 | 11/1968 | Pietra | 29/271 |
| 3,632,220 | 1/1972 | Lansinger et al. | 415/112 |
| 3,901,623 | 8/1975 | Grennan | 415/170 A |
| 4,016,636 | 4/1977 | Schneider et al. | 29/464 |

FOREIGN PATENT DOCUMENTS

| | | | |
|---|---|---|---|
| 890901 | 10/1954 | Fed. Rep. of Germany | 415/170 A |
| 1000236 | 1/1957 | Fed. Rep. of Germany | 415/170 A |
| 603079 | 4/1926 | France | 29/464 |
| 889922 | 1/1944 | France | 415/173 R |
| 99859 | 12/1961 | Netherlands | 415/173 A |
| 330908 | 6/1958 | Switzerland | 29/271 |
| 1359380 | 7/1974 | United Kingdom | 415/219 C |

*Primary Examiner*—Francis S. Husar
*Assistant Examiner*—Daniel C. Crane
*Attorney, Agent, or Firm*—Jacobs & Jacobs

[57] ABSTRACT

A centrifugal pump of the type comprising a housing, a shaft rotatably mounted in said housing via a bearing, a wheel having a hub fixed to the shaft, a seal assembly comprising on the one hand a counter-ring and on the other a seal including a friction ring secured to a flexible member and resiliently urged against said counter-ring, the counter-ring and the flexible member being secured to respective connection members, of which the first one is drive-fitted in a recess in the housing and abuts against a shoulder of said recess and the second one is fixed to the wheel hub, wherein the wheel has a plurality of angularly distributed openings and said first connection member of the side remote from said shoulder has a radial thrust surface facing said openings, and a retainer, whose axial position relative to the shaft is fixed, is provided to keep the seal assembly assembled prior to its mounting in the housing.

2 Claims, 7 Drawing Figures

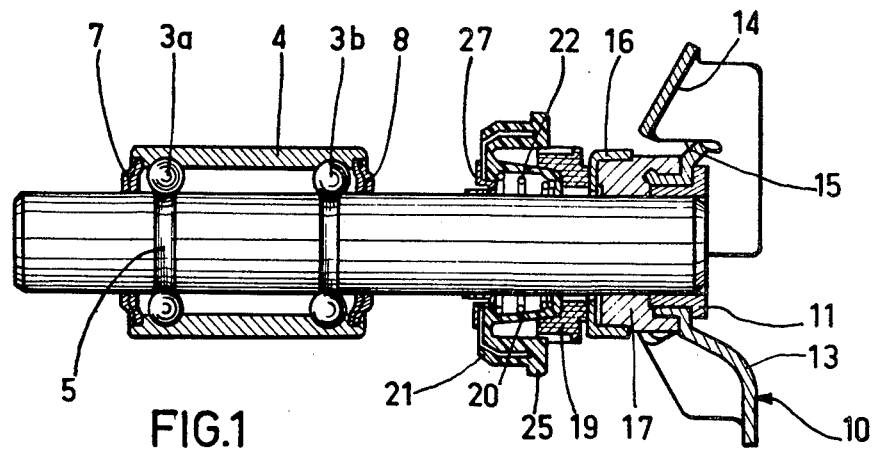
FIG.1
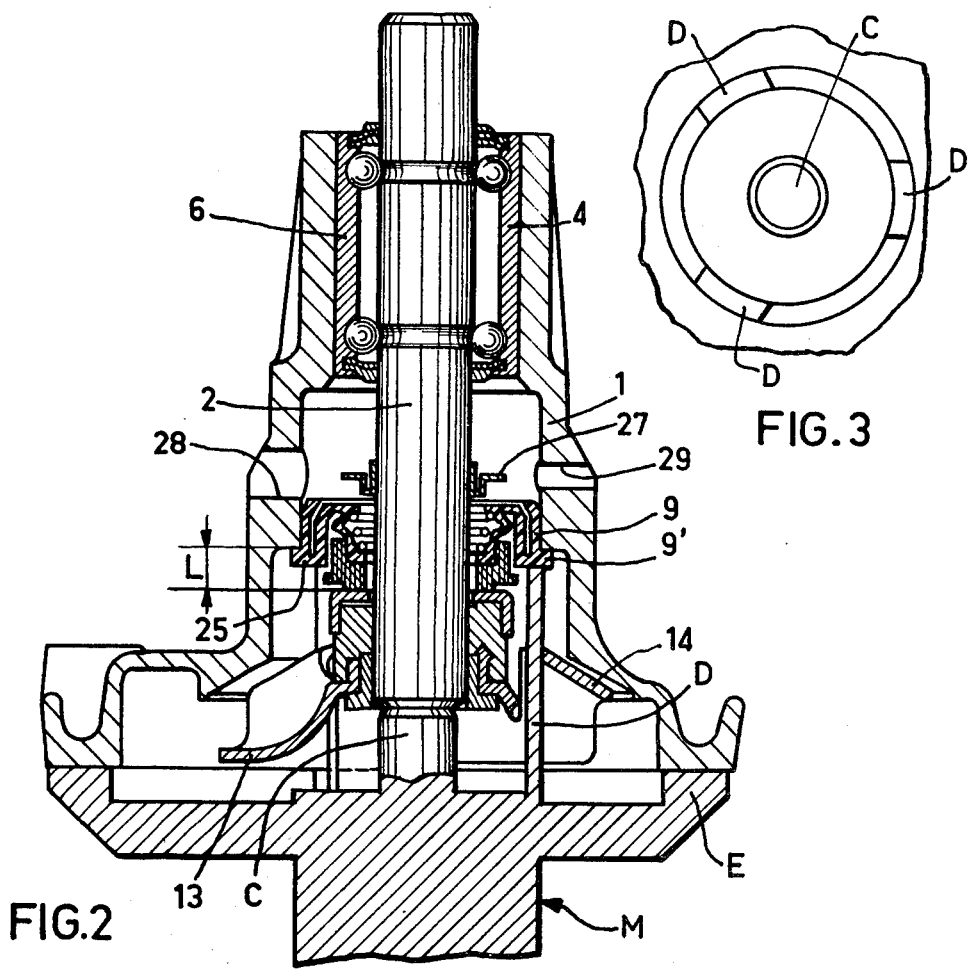
FIG.2
FIG.3

IMPROVEMENT IN ASSEMBLING A CENTRIFUGAL PUMP

This is a division of Ser. No. 722,644 filed Sept. 13, 1976, now abandoned.

The invention relates to centrifugal pumps, and particularly vehicle water pumps.

Pumps of this kind are known to comprise a housing, a shaft rotatably mounted in the housing via a bearing, a wheel having a hub fixed to the shaft, a seal assembly comprising on the one hand a counter-ring and on the other a seal including a friction ring secured to a flexible member and resiliently urged against the counter-ring, the counter-ring and the flexible member being secured to respective connection members, of which the first one is fitted in a recess in the housing and abuts against a shoulder of said recess and the second one is fixed to the wheel hub.

Heretofore such a pump has been assembled by successively placing in the pump housing the shaft with its bearing, the seal and counter-ring and finally the wheel.

An assembly procedure of this type has various disadvantages including the difficulty of assembling the various members under the necessary conditions of cleanness for satisfactory operation. Thus, the friction surfaces of the ring and the counter-ring must remain perfectly clean and free from scratches so that sealing is ensured.

Moreover, this procedure is costly due to its complexity and leads to a large amount of rejects.

Finally, storage is complicated by the relatively large number of components.

The object of the invention is to obviate these disadvantages by providing a pump of the type described hereinbefore in which the shaft with its bearing, the seal, the counter-ring and the wheel are formed as a unit which can be fitted in the pump housing in a single assembling step.

To this purpose, in the pump according to the invention, the wheel has a plurality of angularly distributed openings and said first connection member on the side remote from said shoulder has a radial thrust surface facing said openings, and a retainer, whose axial position relative to the shaft is fixed, is provided to keep the seal assembly assembled prior to its mounting in the housing.

The shaft, wheel, counter-ring and seal are formed as a single unit which is kept assembled prior to its fitting in the pump housing. This fitting step is achieved in a very simple manner by means of a mandrel having a plurality of projecting fingers arranged in such a way that they can traverse the openings in the wheel to engage said thrust surface in order to fit said first connecting member in said recess.

The invention will be better understood from the following description of several embodiments with reference to the attached drawings, wherein:

FIG. 1 is an axial section of a first embodiment of the unit composed of the shaft, seal, counter-ring and wheel;

FIG. 2 shows the fitting of the unit of FIG. 1 in a pump housing as well as the fitting mandrel;

FIG. 3 is an end view of the central portion of the fitting mandrel;

Figure 4:
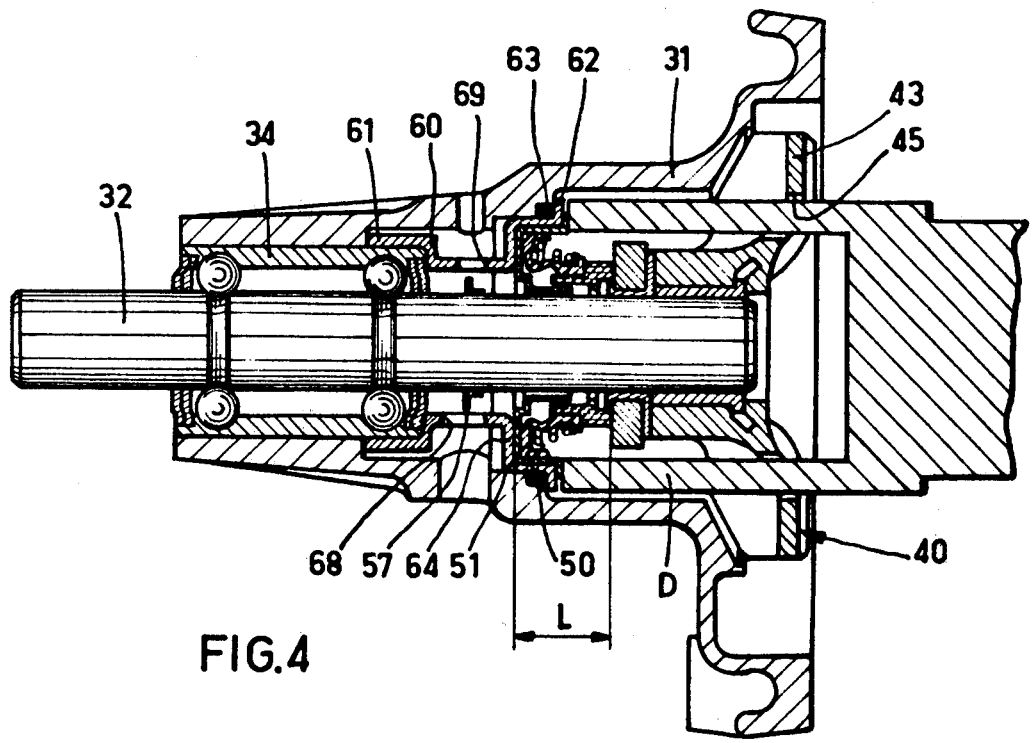
FIGS. 4 to 7 are similar to FIG. 2, but show alternative embodiments.

The pump shown in FIG. 2 comprises a housing 1 having mounted therein the unit shown in FIG. 1. The sealing plate which is fixed to housing 1 once the unit has been fitted is not shown.

The unit of FIG. 1 substantially comprises shaft 2 with its bearing, the sealing assembly formed by the seal and the counter-ring, and the wheel.

The bearing has two rows of balls 3a, 3b mounted between the cage 4 and the grooves 5 formed on shaft 2, the cage being tightly fitted in a bore 6 of the pump housing. Two lateral seals 7, 8 are provided to prevent the grease contained in the bearing from escaping to the outside.

The wheel 10 is fixed to a hub 11 secured to shaft 2 at the end of the latter remote to the bearing. The wheel 10 is of the type described in French Pat. No. 1 300 199 and comprises a stamped metallic flange having projecting sectors 13 and hollowed out sectors 14 which are arranged in alternating manner. Openings 15 are made in the hallowed out zones 14 both in order to improve the efficiency as explained in the above-mentioned Patent, and to permit the fitting of the unit in the manner described hereinafter.

The wheel 10 is fixed by crimping and brazing to the fritted steel hub 11 drive-fitted onto shaft 2.

The seal assembly comprises as the movable part the counter-ring 16 fixed to the shaft via a sleeve 17 and as the fixed part secured to the pump housing the friction ring 19 fixed to the flexible member 20 having a thicker external extension 21 mounted in the recess 9 in the housing 1 having a shoulder 9', spring 22 urging ring 19 against the counter-ring 16 to bring about sealing.

In FIG. 1 the device is in the relaxed state and is kept assembled by the abutment constituted by the centrifugal ring 27 shown in the form of a stamped metallic member but which can also be made from a plastics material or a moulded elastomer.

The outer portion 21 of the seal is terminated on the wheel side by a flange 25 which on the wheel side forms a thrust surface radially facing the openings 15 of the turbine and on the other side an abutment surface engaging shoulder 9'.

For fitting purposes, a mandrel M is used comprising a nose C in contact with the end of shaft 2 and finger-like extensions D whose number is the same as the number of openings 15 in the wheel.

The fitting steps are as follows:

(1) The pump housing 1 is heated in a drier to a temperature compatible with the material used and which can be between 120° and 160° C.

(2) The unit is placed on the mandrel M while introducing the fingers D of the mandrel in the openings 15 of the wheel.

(3) The pump housing, whose bore 6 has been enlarged by expansion, is fixed onto the slide of a lower power pneumatic or hydraulic press in such a way that it is correctly presented with a precise centering relative to the unit.

(4) The pump housing is lowered onto unit up to a relative axial position defined by the mandrel and more specifically by the end of the fingers D and by the extension E.

The axial spacing between the end faces of fingers D and the terminal face of nose C is such that once the unit is fitted in position spring 22 is compressed to such an amount that the spacing L (FIG. 2) between shoulder 9' and the contact surface between counter-ring 16 and friction ring 19 is respected. This dimension must be adhered to because the satisfactory operation of the seal assembly is dependent thereon.

It is clear that this mounting step makes it possible to obtain at a time the fitting of cage 4 in bore 6 of the barrel, the firring of portion 21 of the seal in the recess 9 of the housing and the adjustment of the compressive force exerted by spring 22.

Once the unit is assembled the seal is departed from the centrifugal ring 27 face to which an opening 28 for discharging any drops of liquid which may be present and an air intake 29 are formed in the pump housing. This enables the condition of the seal assembly to be checked and prevent any condensation which could be dangerous for the bearing.

When the pump housing cools the bore 6 shrinks and cage 4 of the bearing is radially tightened which ensures an optimum operation of the bearing. Furthermore, the force used for fitting is low so that there is no danger of damaging the bearing by excessive axial stressing.

Once the mandrel M is removed, it is then merely necessary to secure the sealing plate (not shown) to the housing 1 to obtain a pump which is ready for use.

Thus, a pump has been constructed by means of one extremely simple operation in which the precise adjustment of the compression of the seal is reliably obtained. Moreover, the use of the described unit considerably simplifies storage problems.

FIGS. 4 to 7 illustrate other embodiments of the pump according to the invention.

In the embodiment according to FIG. 4, the seal is held in place by a spacer 60 whose end 61 is drive-fitted onto cage 31 of the housing and whose other end has a flange 62 which fulfils the functions of flange 25 of the embodiment of FIGS. 1 and 2. The flange 62 compresses a rubber O-ring 63 which brings about the static sealing within the pump housing 31.

The seal comprises a metallic box 51 crimped onto the flexible member 50 and fixed to the shouldered portion 64 of spacer 60. In this embodiment the seal is in its operative position prior to assembly of the pump, so that dimension L is respected.

The spacer 60 has openings 68 and 69 positioned axially face to openings 58 and 59 in the pump housing for the removal of droplets expelled by the centrifugal ring 57.

In this embodiment the fitting mandrel only has the fingers D which bear directly against flange 62. Thus, the joint is pre-set so that the thrust on shaft 32 is no longer necessary.

The wheel 40 differs from the wheel 10 of FIG. 1 and comprises a series of blades 43 arranged in conventional manner and between which are provided openings 45 for the passage of the fingers D of the mandrel.

Figure 5:
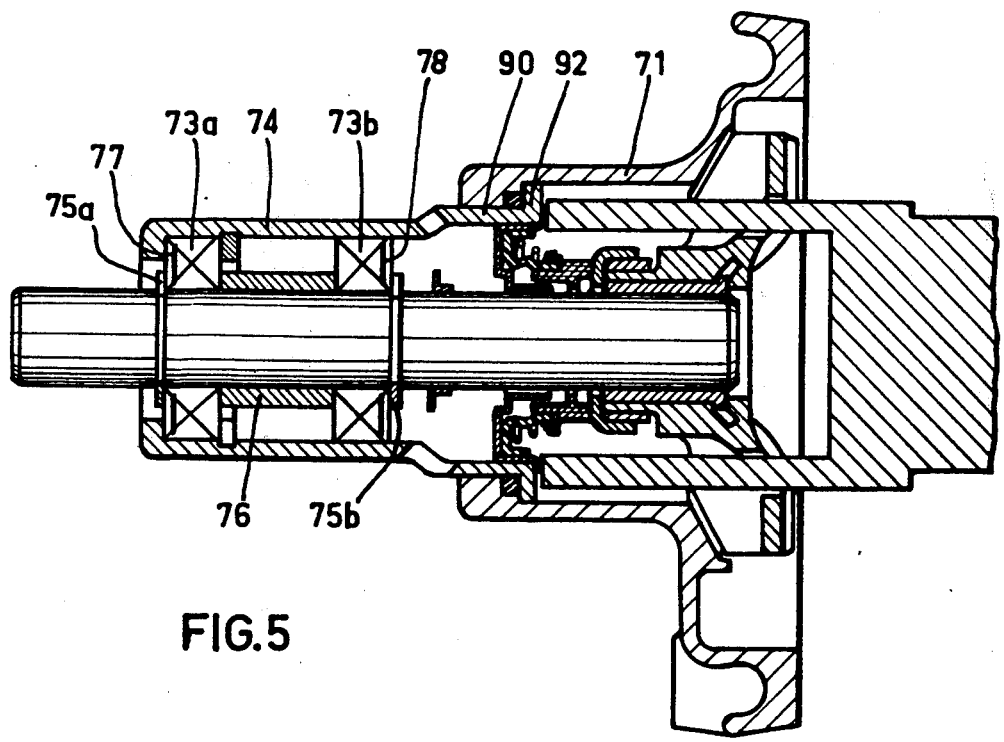

A further very advantageous embodiment of the invention due to the fact that it permits a significant reduction in the length of the pump housing is shown in FIG. 5. The ball bearings 73a and 73b held in place in conventional manner by snap rings 75a, 75b and a spacer 76 are mounted in a box 74.

Seals 77, 78 prevent escape of the grease required for lubricating the bearings.

Box 74 has a extension 90 which fulfils the same function as the shouldered portion 64 of spacer 60 of FIG. 4.

Extension 90 terminates with a flange 92 which acts as an abutment during the fitting of extension 90 into the pump housing 70 and compresses the seal 93 providing for the static sealing.

The box 74 also has axially positioned openings 98, 99 facing the centrifugal ring 97.

The mandrel is identical to that of FIG. 4, the axial positioning of the seal being fixed to assembling.

Figure 6:
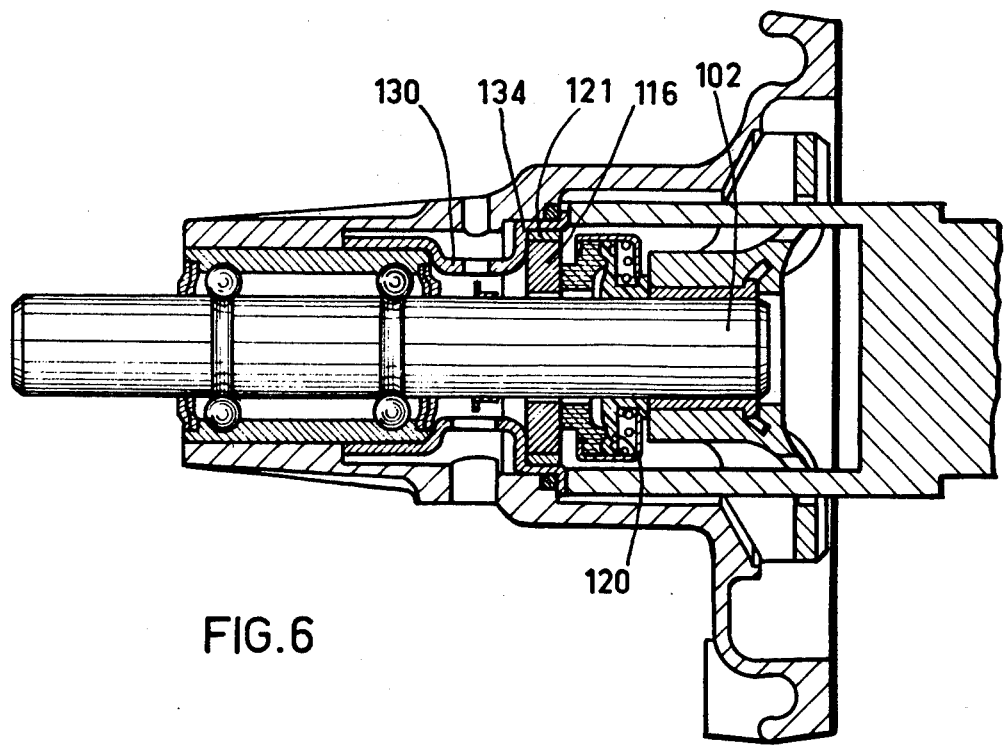
Figure 7:
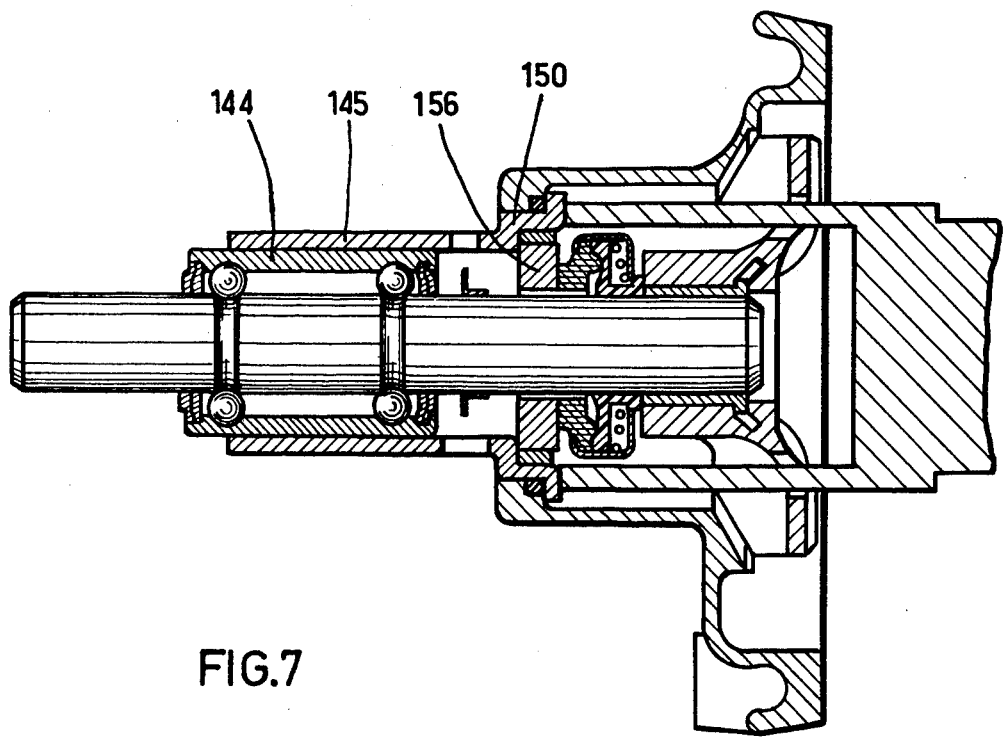

The constructions of FIGS. 6 and 7 are respectively similar to the constructions of FIGS. 4 and 5 with the difference that in this case the counter-ring is fixed to the pump housing and the seal is fixed to the shaft. Consequently, the seal now rotates and the counter-ring remains stationary.

It can be seen from FIG. 6 that the counter-ring 116 is fixed to the spacer 130 by drive-fitting in the shouldered portion 134 with the interpositioning of the elastomer seal 121, and the flexible member 120 is fitted onto shaft 102.

In the construction of FIG. 7, the counter-ring 156 is likewise fixed to the extension 150 of box 145 which is itself fitted to the cage of bearing 144.

I claim:

1. In a method of assembling a centrifugal pump comprising a housing formed with a bore therethrough, said bore having a forward portion of reduced diameter and a rearwardly facing shoulder, a bearing having its outer ring fixed in said forward portion, a driving shaft supported for rotation in said bearing, a wheel having a hub secured to the driving shaft, said wheel being formed with a plurality of angularly distributed openings axially facing said shoulder, a seal assembly surrounding the shaft and comprising on the one hand a counter-ring and on the other hand a seal including a flexible member, a friction ring secured thereto and resilient means for biasing said friction ring to engage said counter-ring, and an annular connection member to which is secured one of the seal and counter-ring, said connection member being drive fitted in the housing and formed with a radially outward flange abutting said shoulder, and said connection member constituting a fixed part of the seal assembly and the other one of the seal and counter-ring constituting a rotary part of the seal assembly, the improvement which comprises the steps of providing retainer means on the shaft adjacent the annular connection member, placing the fixed part of the seal assembly around the shaft and drive fitting on the shaft said hub carrying the wheel and the rotary part of the seal assembly so as to form a single unit in which the seal assembly is held in assembly by said retainer means, placing said unit on a thrust mandrel having axially disposed extensions so that the latter are introduced in said openings of the wheel, presenting the pump housing with a correct centering relative to the unit and driving said connection member in the pump housing into abutment with said shoulder.

2. A method as claimed in claim 1, in which the step of providing said retainer means comprises securing a centrifugal ring on the shaft and the mandrel further comprises a central protruding portion for thrusting the shaft to drive fit said bearing in said forward portion of the bore.

* * * * *